(12) United States Patent
Giannopoulos (10) Patent No.: US 6,400,127 B1
(45) Date of Patent: Jun. 4, 2002

(54) DUAL MODE PULSE-WIDTH MODULATOR FOR POWER CONTROL APPLICATIONS

(75) Inventor: Demetri Giannopoulos, Norwalk, CT (US)

(73) Assignee: Philips Electronics North America Corporation, New York, NY (US)

( * ) Notice: Subject to any disclaimer, the term of this patent is extended or adjusted under 35 U.S.C. 154(b) by 0 days.

(21) Appl. No.: 09/781,473

(22) Filed: Feb. 12, 2001

(51) Int. Cl.[7] .............................. G05F 1/40; G05F 1/44
(52) U.S. Cl. .................... 323/283; 323/285; 323/286
(58) Field of Search ................................ 323/283, 284, 323/286, 285

(56) References Cited

U.S. PATENT DOCUMENTS

| | | | |
|---|---|---|---|
| 4,904,919 A | * 2/1990 | McNaughton | ............... 318/798 |
| 5,343,016 A | 8/1994 | Davis et al. | ............... 219/130.4 |
| 5,723,963 A | * 3/1998 | Li et al. | ...................... 318/590 |
| 5,729,448 A | 3/1998 | Haynie et al. | ................. 363/97 |
| 5,764,024 A | 6/1998 | Wilson | ........................ 318/805 |
| 5,777,462 A | * 7/1998 | Yue | ............................. 323/285 |
| 5,838,515 A | * 11/1998 | Mortazavi et al. | ........ 360/78.12 |
| 5,995,386 A | * 11/1999 | John et al. | ................ 363/21.18 |
| 6,236,179 B1 | * 5/2001 | Lawler et al. | .............. 318/439 |

\* cited by examiner

*Primary Examiner*—Bao Q. Vu
(74) *Attorney, Agent, or Firm*—Steven R. Biren (57) ABSTRACT

A dual-mode modular pulse-width-modulator capable of outputting low-speed and high-speed control signals is presented. In one mode, a control signal is generated based on timing parametric data stored in a memory. In a second mode, a control signal is generated based on timing parametric data stored in a memory and an external input. Timing parametrics and control variables used to determine the operational mode can be pre-loaded in the memory or loaded through a communication link.

13 Claims, 7 Drawing Sheets

DUAL MODE PULSE-WIDTH MODULATOR FOR POWER CONTROL APPLICATIONS

RELATED APPLICATION

This application relates to U.S. Pat. No. 6,157,093 entitled, MODULAR MASTER-SLAVE POWER SUPPLY CONTROLLER, filed, Sep. 27, 1999, and assigned to the same assignee, herein.

FIELD OF THE INVENTION

The present invention relates to the field of control systems. More specifically, this invention relates to modular power control systems using pulse-width control modulators

BACKGROUND OF TIE INVENTION

Figure 1:
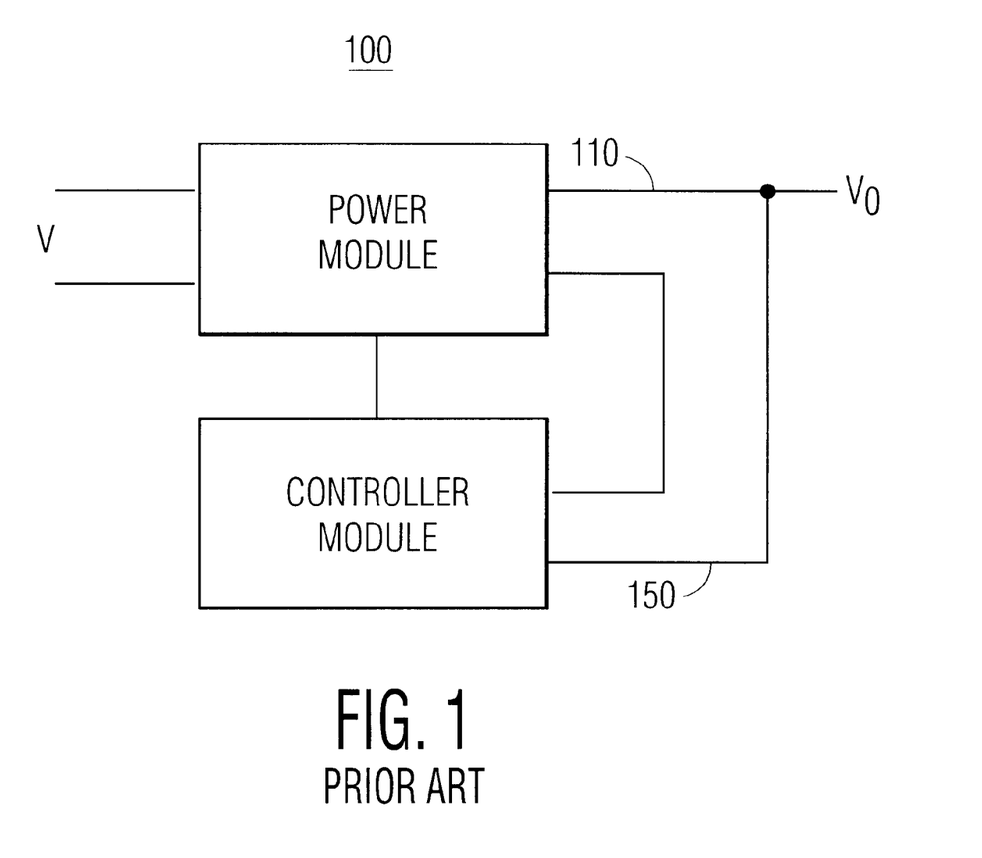
FIG. 1 illustrates a conventional block diagram of a switching power supply.

FIG. 1 illustrates a conventional switching power module. As illustrated, an alternating (AC) voltage is input into power conversion module 110, which produces a direct (DC) output voltage, Vo. Output voltage, Vo, is input to feedback compensation control circuit 150, which monitors the value of output voltage Vo and adjusts the internal parameters of power conversion module 10 to maintain Vo relatively constant. The processing of feedback compensation control circuit 150 is well known in the art and may be implemented in special-purpose circuits, such a Field Programmable Gate Arrays (FPGAs) or Application Specific Integrated Circuits (ASICs).

The use of Application Specific Integrated Circuits to implement the control of power supplies is well known in the art. ASICs can perform the functions of a variety of discrete components on a single Integrated Circuit (IC). This is advantageous as the size of the controller and the overall size of the power supply can be reduced. Also, in large quantity, the cost of an ASIC is significantly less than the cost of discrete components that are required to perform the same functions. Hence, the overall cost and physical size of power supply units is reduced when ASIC technology is employed.

ASICs may be custom-made for the application or may be "off-the-self" components. Custom-made ASICs are expensive and time-consuming to develop. Since the initial development cost for custom-made ASICs may be high, these devices are used in high volume applications. In such cases the development costs can be spread-out over the price of all the units sold. In addition, custom-made ASICs are typically designed to operate with a particular type of component or a component manufactured by a particular manufacturer.

Off-the-shelf ASICs are typically preprogrammed with known functions and require external devices, components or other hardware in order to use them in a designated application. The external components are necessary to interface the off-the-shelf ASIC to a particular device or component. The use of external components, however, is disadvantageous as their use increases the cost and the size of the power supply. A second disadvantage is that when the component is changed, the interface may also have to be changed, which consequently causes the ASIC to be changed.

One method of creating power supply controllers using off-the-shelf components to distribute processing among generic component blocks. The generic component blocks can consist of programmable micro-controllers that communicate operational commands to control devices, such as Pulse Width Modulators (PWM), over a data bus. Pulse Width Modulators are routinely included as peripherals in micro-controller based integrated circuits. Timing parameters, such as frequency, i.e., period, on-time, off-time, etc., which are used to control the output voltage level are stored in registers accessible by a micro-controller. Modularization of power supply controllers is disclosed in U.S. Pat. No. 6,157,093 and incorporated by reference herein.

Figure 2:
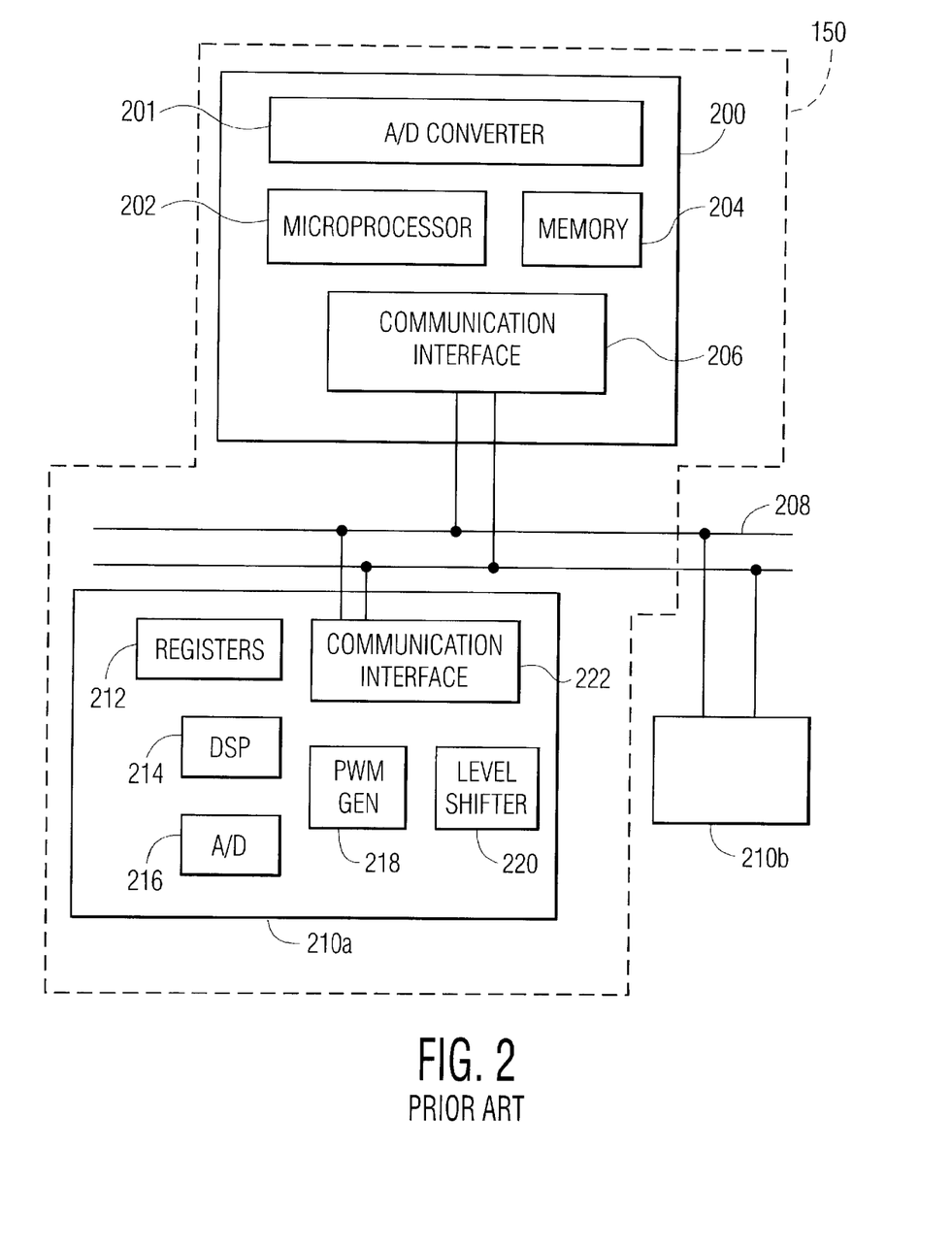
FIG. 2 illustrates a conventional distributed power supply feedback compensation control circuit.

FIG. 2 illustrates a conventional modular digital power supply controller 150 comprised of a master unit 200 and at least one slave unit 210a, 210b. As illustrated, master unit 200 is composed of processor 202, memory 204 and communication interface 206. Analog-to-digital (AID) converter 201 may optionally be included for conversion of analog signals to digital form for processing by processor 201. Slave units 210a, 210b are composed of communication interface 222, PWM generator 218, registers 212 and micro-controller or DSP 214. Analog-to-digital (A/D) converter 216 may optionally be included for conversion of analog signals to digital form for processing. PWM generators 218 are routinely included as peripherals in micro-controller integrated circuits. In such cases, timing parameters, e.g., frequency, on-time, off-time, etc., can be are stored in register 212. These values can be set in register 212 by local micro-controller 214 or remotely by processor 202 over communication link 208.

Remotely controlled operation of PWM is, however, limited because of bandwidth constraints. In voltage-mode control applications, the control of power module 150, of FIG. 1, by PWM 218 is in the order of few hundred or a few thousand hertz. In this case, the rate of updating the register content is relatively low, hence, the limited bandwidth of micro-controller 202, such as, 80C51-based micro-controllers, or data bus 208 is sufficient for updating the registers stored in slave unit 210a, for example. On the other hand, in current-mode control applications the PWM output is required to respond within a few hundred nanoseconds. Being bandwidth limited, the earlier described distributed power supply controller cannot respond within such a short time period. Hence, there is in a need in the art to provide a means for high-speed updating of pulse width modulator parameters that does not require expensive high-speed components and control signals.

SUMMARY OF THE INVENTION

A pulse width modulator (PWM) capable of exercising control signals in voltage-controlled, i.e., low-speed, and current-controlled, i.e., high-speed, power supply controllers is presented. The pulse width modulator, responsive to initial or slowly updated control signals can initiate control signals that provide either a slow-speed or high-speed changes. In one aspect of the invention, wherein the PWM is in communication with a relatively slow processor over a band-limited digital communication link, the PWM can be used to generate, an otherwise band-limited, control signal in response to a rapidly changing input signal. In this aspect of the invention, the modular construction of power supply controller provides a level of flexibility and interchangeability without incurring the cost of custom-made IC development.

It is to be understood that these drawings are solely for purposes of illustrating the concepts of the invention and are not intended as a definition of the limits of the invention. It will be appreciated that the same reference numerals, possibly supplemented with reference characters where appropriate, have been used throughout to identify corresponding parts.

DETAILED DESCRIPTION OF THE INVENTION

Figure 3:
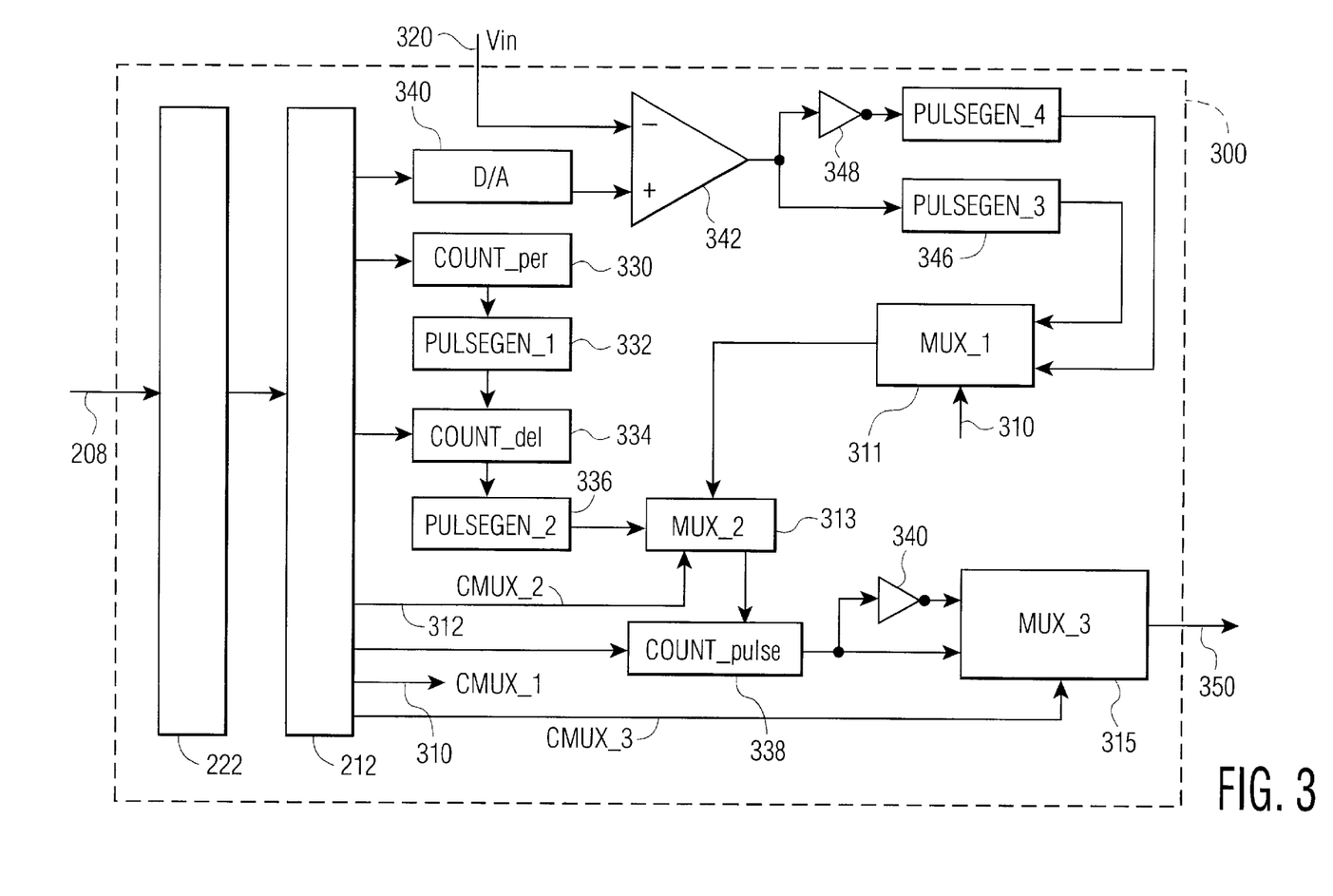
FIG. 3 illustrates an exemplary pulse width modulator in accordance with the principles of the present invention.

FIG. 3 illustrates an exemplary embodiment of a dual-mode pulse width modulator (PWM) 300 in accordance with the principles of the present invention. In this exemplary embodiment, control signals 310, 312 and 314, respectively labeled CMux-1, CMux-2 and CMux-3, are stored in control register 212 and are used to control the state of multiplexers/switches 311, 313 and 315, respectively. Control signals CMux-1, CMux-2 and CMux-3 are used to program the functionality of PWM 300 by controlling signal paths through PWM 300. In one aspect of the invention, control signals Mux-1, Mux-2 and Mux-3 are determined and set by an external micro-controller 212 (not shown) via communication link 208 and interface 222. In a second aspect of the invention, and the one discussed herein, control signals Mux-l, Mux-2 and Mux-3 are stored in registers or memory 212. The values in the registers or memory 212 may be set by an external micro-controller or may be pre-loaded.

Figure 6:
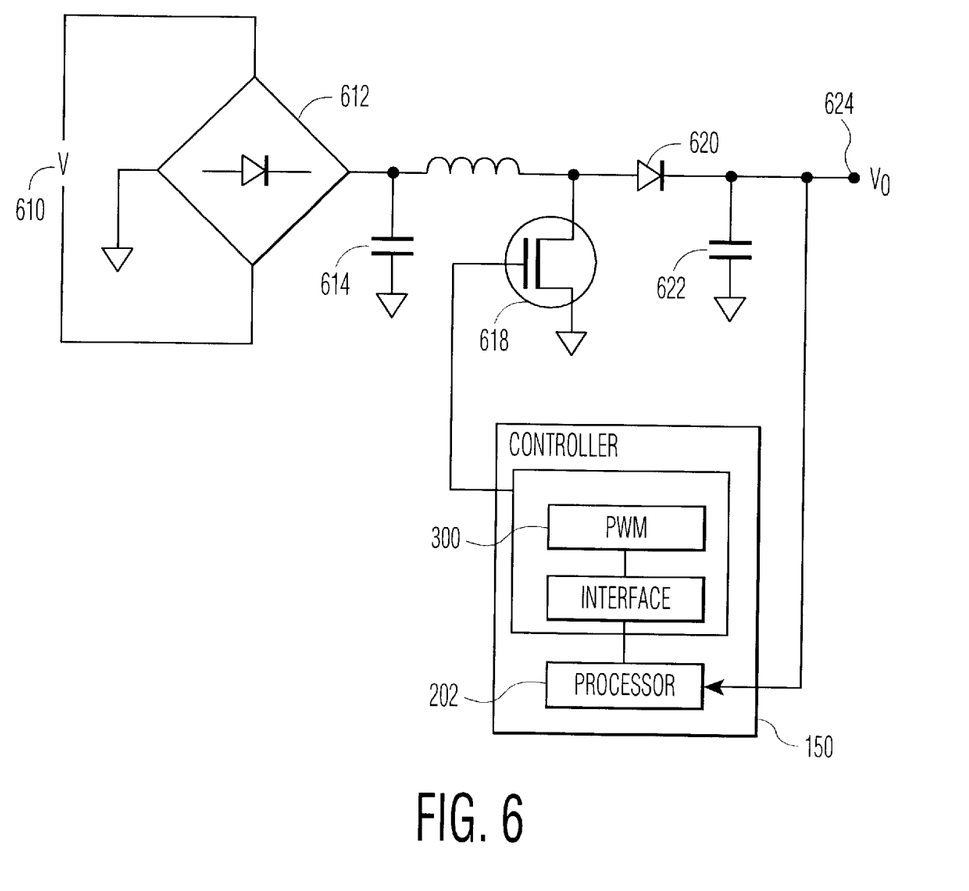
FIG. 6 illustrates an exemplary voltage-mode control circuit implemented in accordance with the principles of the invention.
Figure 7:
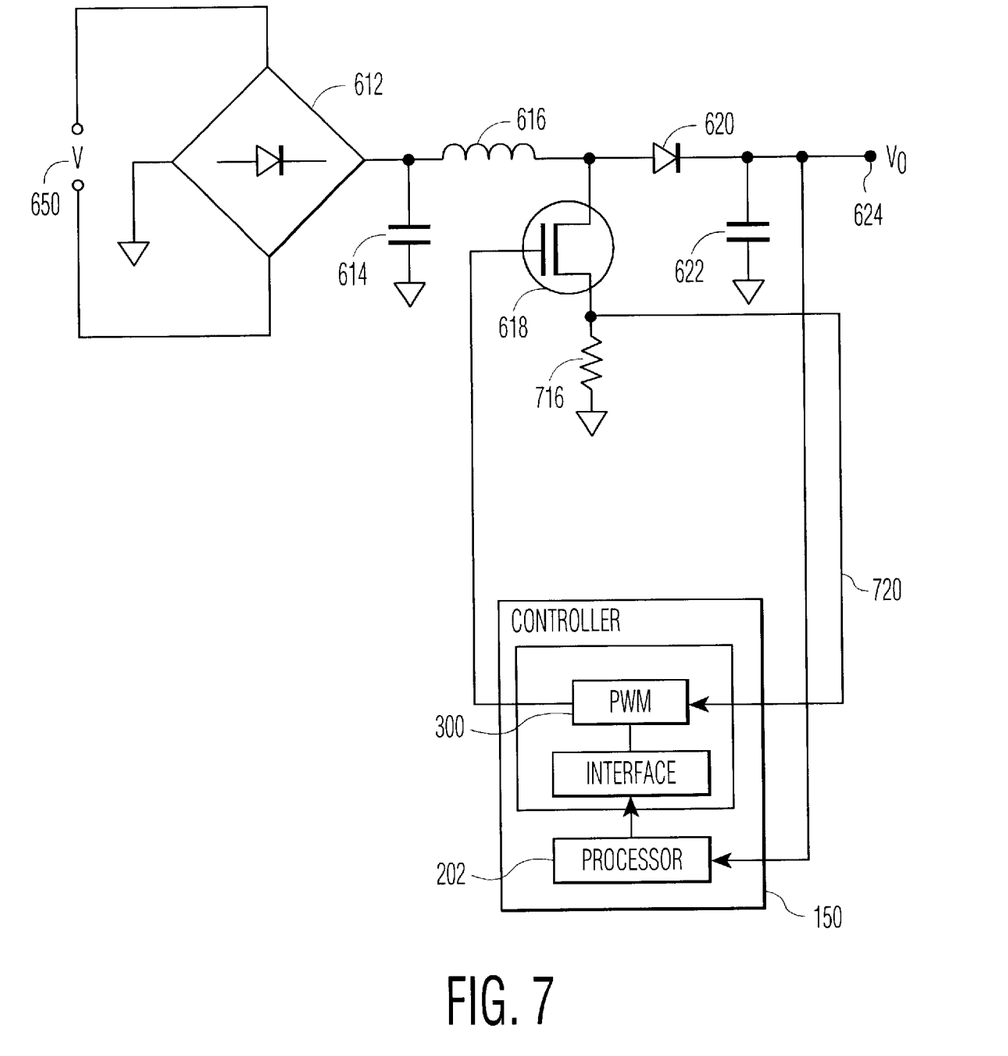
FIG. 7 illustrates an exemplary current-mode control circuit implemented in accordance with the principles of the invention.

In this exemplary embodiment of a dual-mode PWM 300, control signal 312, i.e., CMux-2, is used to select between a voltage-mode control, as illustrated in FIG. 6, and a current mode control, as illustrated in FIG. 7, which will be discussed in further detail below. That is, when multiplexer/switch 313, i.e., Mux-2, is set to select current-mode control, the output of multiplexed/switch 311, i.e., Mux-1, is representative of the output of PWM 300. On the other hand, when multiplexer/switch 313, i.e., Mux-2, is set to select voltage-mode control, the output of pulse generator 336 is representative of the output of PWM 300.

In voltage-control mode, generator 330, receives at least one known value, which is stored in control register 212, and generates a signal, labeled, herein as, COUNT_per. In an alternate embodiment signal COUNT_per can be synchronized to a fixed external signal (not shown). Pulse generator 332, receiving signal COUNT_per, generates signal PULSEGEN_1 synchronously with signal COUNT_per. Signal PULSEGEN_1 is pulse signal representative of a transition of signal COUNT_per from one fixed state to a second fixed state. For example, pulse generator 332 may be a "one-shot" pulse generator, which generates a pulse on a detected state transition of the input signal. In one embodiment of the invention, pulse generator 332 can generate signal PULSEGEN_1 on a leading edge of signal COUNT_per. In an alternate embodiment, pulse generator 332 can generate signal PULSEGEN_1 on a trailing edge of signal COUNT_per.

Signal PULSEGEN_1 is next input to generator 334. Generator 334 receiving at least one input value stored in control register 212 and signal PULSEGEN_1, generates signal COUNT_del. Signal COUNT_del is generated synchronously with signal PULSEGEN_1 and has a known pulse width set by the at least one known value stored in register 212. Pulse generator 336, receiving signal COUNT_del, next generates a pulse signal, labeled PULSEGEN_2 when a transition from one state to a next state is detected in signal COUNT_del. In one embodiment of the invention, pulse generator 336 can generate signal PULSEGEN_2 on a tailing edge of signal COUNT_del. Alternatively, pulse generator 336 can generate signal PULSEGEN_2 on a leading edge of signal COUNT_del. Similar, to generator 332, generator 336 may be a "one-shot" generator.

Signal PULSEGEN_2 is then input to multiplexer/switch MUX_2, 313, which, in this case, is set to voltage-control mode by control signal CMUX_2, 312. Accordingly, signal PULSEGEN_2 is input to pulse generator 338. Pulse generator 338, receiving at least one known value stored in control register 212 and signal PULSEGEN_2, generates signal COUNT_pulse, synchronously with signal PULSEGEN_2 and having a known pulse width determined by the at least one known value stored in register 212.

Signal COUNT_pulse is then input to multiplex/switch MUX_3, 315. Multiplex/switch MUX_3, 315 is controlled by control signal CMUX 3, 314, which is stored in control register 212. In one aspect of invention, signal CMUX_3, 314 is selected to such that signal COUNT_pulse is selected as signal PWMOUT 330, which is the output of controller 150. In a second aspect of the invention, signal COUNT_pulse is inverted by inverter 340 and multiplexer/switch MUX_3, 315 is set, by control signal CMUX_3, to select inverted signal COUNT_pulse as controller output signal PWMOUT 330.

Figure 4:
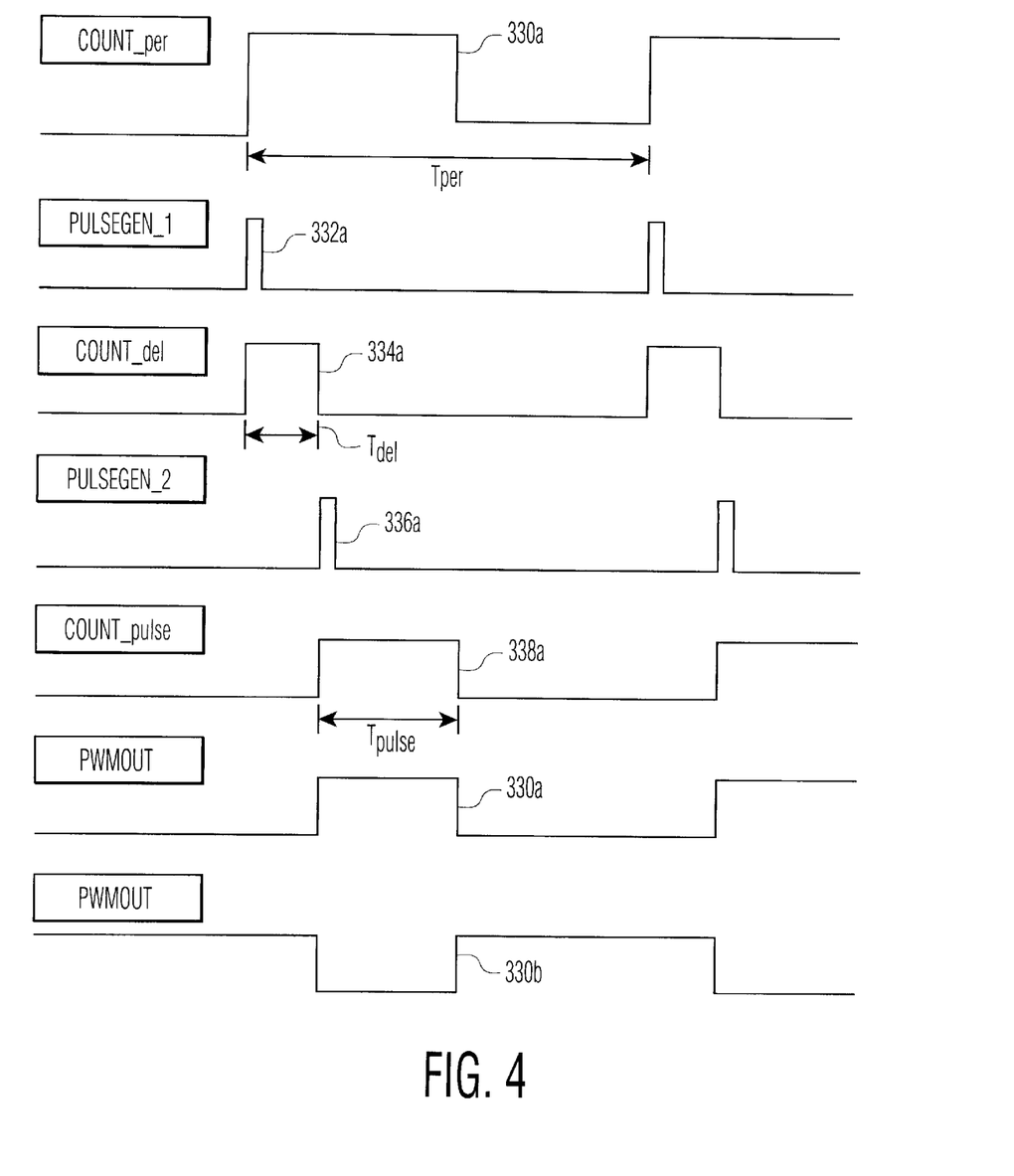
FIG. 4 illustrates timing diagrams of signal waveforms generated by the exemplary pulse width modulator depicted in FIG. 3 operating in a voltage-control mode.

FIG. 4 illustrates timing relations among the signals used to process the voltage-control mode of PWM 300. As illustrated, signal COUNT_per, represented as signal 330a, is a square wave having a known, fixed, period, i.e., frequency, represented as $T_{per}$. Period $T_{per}$ is representative of at least one known value stored in register 212, which in one aspect of the invention can be loaded through communication interface 222 over communication link 208. Signal PULSEGEN_1, represented as signal 332a, is generated synchronously with signal COUNT_per. Signal 332a can be generated, as illustrated, on a leading edge of signal 330a, or, as would be understand in the art, can be generated on a tailing edge of signal 330a. Signal COUNT_del, represented as signal 334a, is generated synchronously with signal 332a and has a pulse duration representative of at least one known value, represented as $T_{del}$. The at least one known value representative of duration, $T_{del}$, is stored in register 212, which in one aspect of the invention can be loaded through communication interface 222 over communication link 208. In a second aspect of the invention, duration $T_{del}$, can be pre-loaded in register 212.

Signal PULSEGEN_2, represented as signal 336a, is generated, as illustrated synchronously with signal COUNT_del. In this illustrative example, signal 336a is generated on a trailing edge of signal 334a. As would be understood, signal 336a may alternatively be generated synchronously with a leading edge of signal 334a.

Signal COUNT_pulse, represented as signal 338a, is next generated, synchronously with signal 336a and has a pulse duration represented as $T_{pulse}$, which is representative of at least one value stored in register 212. Duration $T_{pulse}$ in one aspect of the invention can be loaded through communication interface 222 over communication link 208. In a second aspect of the invention, duration $T_{pulse}$, can be pre-loaded in register 212.

Signal PWMOUT, as represented by signal 330a, in this illustrative example, corresponds to the illustrated signal 338a. In a second aspect of the invention, signal PWMOUT 330a may be selected as an inverted signal 338a, which is illustrated as signal 330b. The selection of signal 330a or 330b as the output of PWM 300 depends on control variable, CMUX_3, 314, which in this embodiment of the invention is stored in register 212.

Returning to FIG. 3, in a variable frequency current mode operation, a digital representation of a reference voltage is stored in control register 212. As previously discussed, the value stored can be pre-stored in register 212 or can be received via communication link 208 and stored in register 212. The stored digital representation of reference voltage is input to Digital-to-Analog (D/A) converter 340. D/A converter, as is known, converts a value, represented digitally, into a comparable analog value using known scaling factors. Details of D/A conversion are well known in the art and need not be discussed herein. The converted output voltage level of D/A converter, referred to as Vref, is then input to comparator 342.

Signal 320, labeled herein as Vin, is also input into comparator 542. Signal Vin, as will be discussed with more specificity with regard to the circuit implementation illustrated in FIG. 7, is representative of the changing current passing through a control transistor. Signal 320 is a high-speed signal as it is changing on each cycle and must be evaluated and processed in the order of nanoseconds.

The output of comparator 342 is next input to pulse generator 346. Pulse generator 346 generates signal PULSEGEN_3, when, in this illustrated case, signal 320 is greater than reference voltage, Vref. In an alternative embodiment of the invention, the output of comparator 342 is also input to inverter 348. As is known, inverter 348 alters the sense of the input signal. The output of inverter 348 is then input to pulse generator 350, which generates signal PULSEGEN_4. Signal PULSEGEN_4, in this case, is representative of the condition that signal 320 is less than reference voltage, Vref.

In the illustrated example of PWM 300, generated signals PULSEGEN_3 and PULSEGEN_4 are next input to multiplexer/switcher, 311 labeled MUX_1. Control signal 310, stored in control register 212, determines whether signal PULSGEGEN_3 or PULSEGEN_4 is next processed. The signal selected to pass through multiplexer/switch 311 is next input to multiplexer/switch 313, labeled MUX_2. As previously discussed, multiplexer/switch 313 is controlled by control signal 312, labeled CMUX_2. In this case of current mode operation, multiplexer/switch 313 is set to pass the signal selected by multiplexer/switch 313, i.e., either PULSEGEN_3 or PULSEGEN_4, to pulse generator 338. Responsive to the received input, and at least one known value stored in control register 212, pulse generator 338 generates signal COUNT_pulse, as previously discussed.

Figure 5:
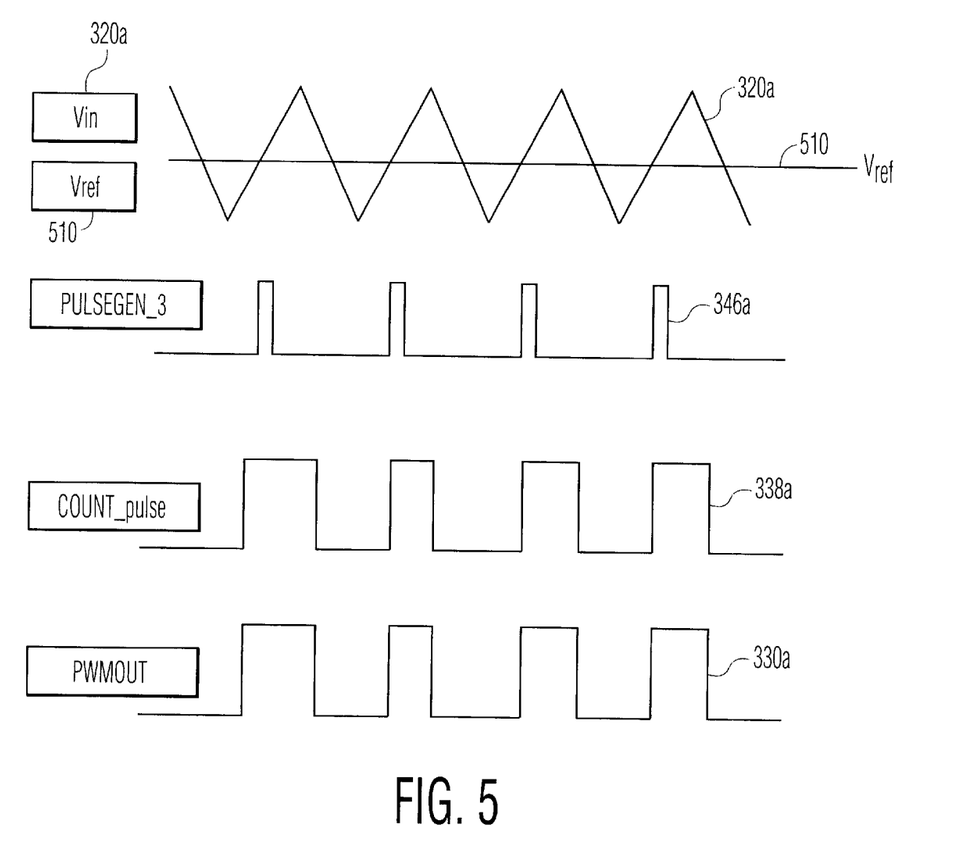
FIG. 5 illustrates timing diagrams of signal waveforms generated by the exemplary pulse width modulator depicted in FIG. 3 operating in a current-control mode.

FIG. 5 illustrates exemplary timing signals in accordance with one embodiment of current-mode operation of the circuit illustrated in FIG. 3. In this embodiment, reference voltage, Vref, 510, is illustrated as a steady reference value. Voltage Vin, labeled 520a, is illustrated as a voltage having a triangular waveform, which is representative of a raising and falling voltage as a power transistor, as will be discussed more fully with regard to FIG. 7, is turned off and on.

Signal PULSEGEN_3, represented as signal 546a, is generated when voltage $V_{in}$, 320a, is greater than reference voltage, Vref. Signal PULSEGEN_3, in this illustrative embodiment, is then selected and input to pulse generator 338. Pulse generator 338 then generates signal COUNT_pulse, represented as signal 338a. Signal COUNT_pulse is generated having a pulse duration represented as $T_{pulse}$. Signal COUNT pulse, 338a, in this case, is selected as the output signal PWMOUT, represented as 330a, using control variable CMUX-3 314 to position multiplexer/switch 315 to select COUNT_pulse input, rather that inverted COUNT_pulse input.

In another aspect of the invention, control signals or variables CMux-L, CMux-2 and CMux-3, and known time values or variable $T_{per}$, $T_{del}$, and $T_{pulse}$ can be set by controller 200 by an internal bus when register 212 and controller 202 are fabricated on the same chip or wafer. Furtherstill, control signals CMux-1, CMux-2 and CMux-3, and known time values $T_{per}$, $T_{del}$, and $T_{pulse}$ can be preset in register 212. In this aspect of the invention, generalized dual-mode PWM 300 is essentially configured in a single fixed mode.

FIG. 6 depicts an conventional boost switching power supply 100, as shown in FIG. 1, showing a digital implementation of a feedback controller, as shown in FIG. 2, incorporating a pulse width modulator 300 in accordance with the principles of the invention. As illustrated, input alternating (AC) voltage 610, referred to as V, is first rectified by rectifier 612 and stored in inductor 616. The stored energy in inductor 616 is then transferred to capacitor 614. Power transistor 618, e.g., a Field Effect Transistor (FET), is switched off for a known period of time to pass the rectified AC signal to diode 620. Diode 620 provides a one way electrical path to store electrical charge across capacitor 622. Output voltage 624, referred to as Vo, is representative of the output voltage of power supply 100.

Processor 202 within controller 150 monitors the output voltage Vo, 624, and PWM 300 generates signal 330 which adjusts the gate voltage of power transistor 618. Signal 330 controls the time power transistor 618 is maintained in an on-state or an off-state. When power transistor 618 is in an on-state, current flows through transistor 618 and no additional charge is detected across capacitor 622. Accordingly, the voltage level across capacitor 622 decreases (decays) during the period of time transistor 618 is in an on-state. However, when power transistor 618 is in an off-state, current flows through diode 620 and the charge, i.e., voltage, across capacitor 522 increases. Accordingly, output voltage, Vo, 624 is measured as a nominal voltage value across capacitor 622, which increases to a specified level when power transistor 618 is in an off-state and decreases when power transistor 618 is in an on-state. The change in voltage level above and below the nominal voltage level, i.e., a ripple, is representative of the quality of a power supply.

FIG. 7 illustrates the operation of a current-mode controller incorporating a pulse width modulator in accordance with the principles of the invention. In current-mode control, output voltage, Vo 624 and the current generated within power supply 100 are used to control the gate voltage of power switch 618. Thus, in addition to output voltage 624, controller 150 receives a measure of current flowing through power transistor 618, as represented by voltage 720. In this case, while switch 618 is in an on-state, the current flowing through switch 618 is substantially equal to the current in inductor 616. And, when switch 618 is in an off-state, the switch current rapidly drops to zero and the energy stored in inductor 616 flows through diode 620. The charge on capacitor 622 increases.

Although the invention has been described and pictured in a preferred form with a certain degree of particularity, it is understood that the present disclosure of the preferred form, has been made only by way of example, and that numerous changes in the details of construction and combination and arrangement of parts may be made without departing from the spirit and scope of the invention as hereinafter claimed. It is expressly intended that all combinations of those elements and/or method steps which perform substantially the same function is substantially the same way to achieve the same results are within the scope of the invention. Substitutions of elements from one described embodiment to another are also fully intended and contemplated.

What is claimed is:

1. A dual-mode programmable pulse width modulator circuit for regulating a power supply output voltage comprising:

a memory containing at least one control variable and at least one time variable;

at least one pulse generator for generating a first signal based on said at least one time variable;

at least one pulse generator for generating a second signal based on said at least one control variable and an external signal;

a selection device, in communication with said memory, for selecting one signal from said generated first signal and said second signal depending on said at least one control variable; and at least one pulse generator, in communication with said memory, generating said signal in response to said selected signal, said third signal having characteristics determined by said at least one time variable.

2. The circuit as recited in claim 1 further comprising;

an inverter to receive said third signal; and a second selection device in communication with said inverter and said memory, receiving as inputs said third signal and said inverted third signal, said second selection device for selecting between said third signal and said inverted third signal depending on said at least one control variable contained in said memory.

3. The circuit as recited in claim 1 wherein said at least one pulse generator generating said first signal comprises:

a first pulse generator generating a signal having a period based on said at least one time variable stored in said memory.

4. The circuit as recited in claim 3 wherein said at least one pulse generator generating said first signal comprises:

a second pulse generator offsetting said first pulse generator signal based on said at least one time variable.

5. The circuit as recited in claim 1 wherein said at least one time variable is selected from a group comprising time period, delay time, pulse duration.

6. The circuit as recited in claim 1 wherein at least one pulse generator generating said second signal further includes:

a conversion device for converting said at least one control variable to a reference value;

a comparison device for receiving said reference value and said external value and generating an output signal; and a pulse generator for receiving said comparison device output signal and generating a fourth signal when said external signal is greater than said reference value.

7. The circuit as recited in claim 6 further comprising:

an inverter for receiving said comparison device output signal;

a pulse generator for receiving said inverted comparison device output signal and generating a fifth signal; and a third selection device, in communication with said memory, for receiving said fourth signal and said fifth signal, said third selection device for selecting between said fourth signal and said fifth signal depending on said at least one control variable contained in said memory.

8. The circuit as recited in claim 1 further comprising:

a communication device for receiving data over a communication network.

9. The circuit as recited in claim 8 wherein said received data includes said at least one control variable.

10. The circuit as recited in claim 8 wherein said received data includes said at least one time variable.

11. The circuit as recited in claim 8 wherein said received data is loaded in said memory.

12. The circuit as recited in claim 1 wherein said at least one control variable is pre-loaded in said memory.

13. The circuit as recited in claim 1 wherein said at least one time variable is pre-loaded in said memory.

* * * * *